July 10, 1956     A. M. FISCHER     2,754,264
COMBINATION AERATOR AND RINSER
Filed Feb. 5, 1952     2 Sheets-Sheet 1
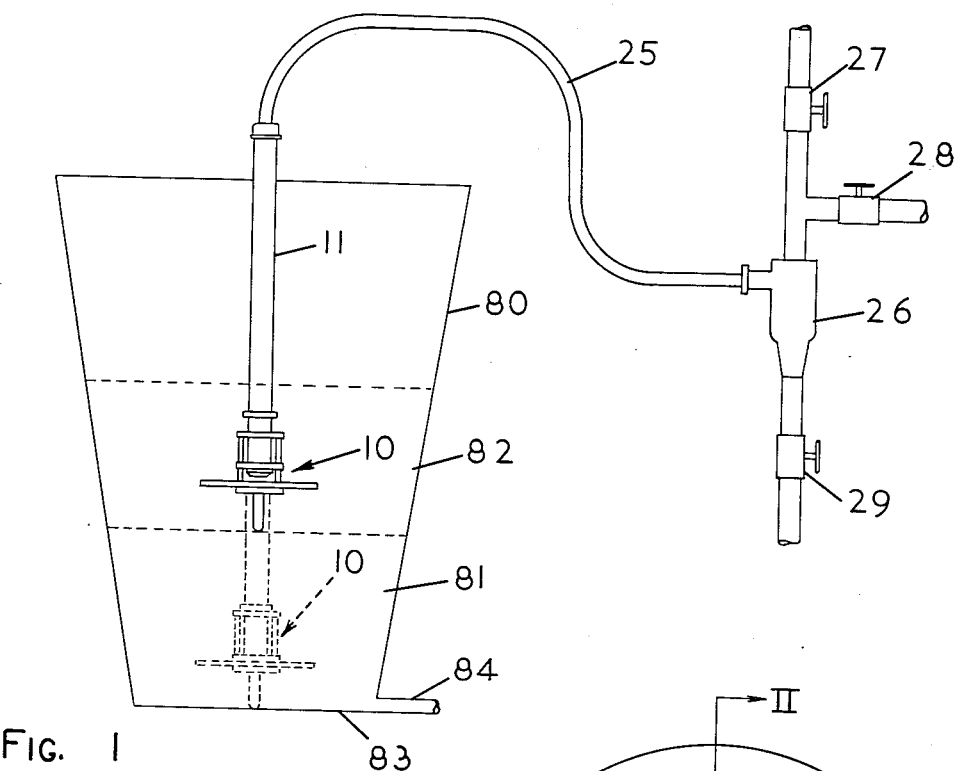
FIG. 1
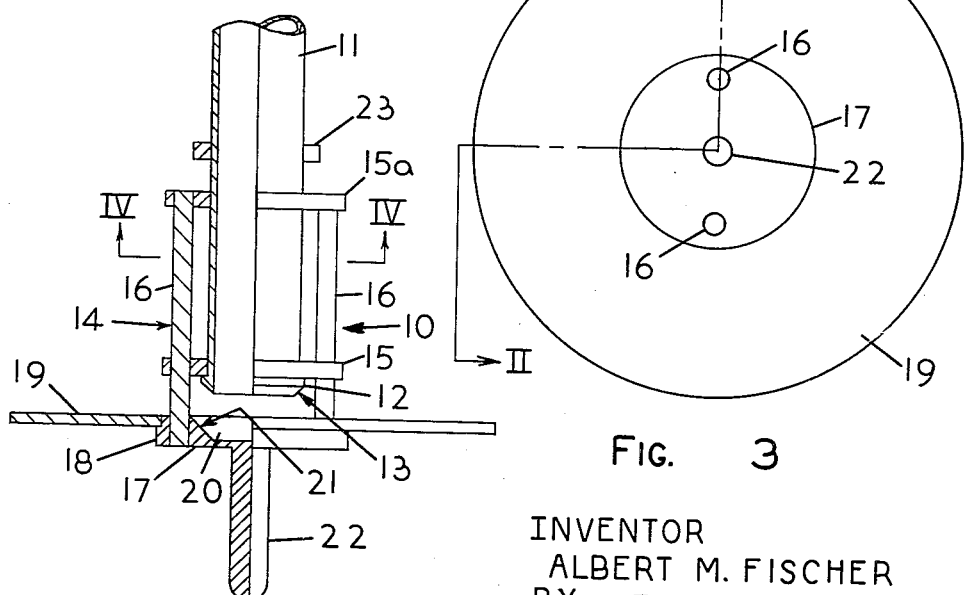
FIG. 2     FIG. 3
INVENTOR
ALBERT M. FISCHER
BY
ATTORNEY July 10, 1956

A. M. FISCHER 2,754,264

COMBINATION AERATOR AND RINSER

Filed Feb. 5, 1952

INVENTOR
ALBERT M. FISCHER
BY
Peter P. Price
ATTORNEY

United States Patent Office 2,754,264
Patented July 10, 1956

2,754,264

COMBINATION AERATOR AND RINSER

Albert M. Fischer, Dowagiac, Mich., assignor to Metal-Glass Products Co., Belding, Mich., a corporation of Michigan Application February 5, 1952, Serial No. 270,088

4 Claims. (Cl. 210—26)

This invention relates to equipment for the culturing of aerobic micro-organisms in a liquid culture media and more particularly to a combination hydraulic ejector, aerator and rinser particularly adapted for effectively aerating a culture and for removing supernating liquid from a tank containing micro-organisms in a dilute suspension without withdrawing excessive quantities of the micro-organisms. My invention is also designed to automatically rinse the tank after removal of the tank's content.

In the brewing industry and in other industries in which cultures of aerobic micro-organisms are utilized, it is necessary to purify the micro-organic culture for the purpose of removing weak and dead micro-organic bodies as well as other extraneous matter. This is done by adding a diluting agent, normally water, to the culture and thoroughly agitating the culture and water to create a suspension of the micro-organisms in the water. After a period of time following this agitation, the strong and healthy micro-organisms settle to the bottom of the tank, leaving the weak and undesirable micro-organisms together with extraneous matter such as bacteria, dead micro-organisms, proteins and other undesirable materials still suspended in the diluting agent. Heretofore, in the withdrawal of this liquid diluting agent appreciable quantities of the body of healthy micro-organisms, settled in the lower portion of the tank, have been removed. The object of my invention is to provide a simple, easily operated and efficient means by which this diluting agent may be withdrawn from the tank without withdrawing any appreciable quantity of the healthy micro-organisms which have settled to the lower portion of the tank.

It is also necessary in the culturing of aerobic micro-organisms that the culture be provided with sufficient oxygen to promote vigorous activity on the part of the micro-organisms. To effect this end, it is important to finely disperse the air throughout the entire culture media, to provide the required oxygen. Thus, the air must be widely distributed throughout the culture media to assure a thorough mixing of the air with the culture media whereby the oxygen will contact and thus be available to all the micro-organisms. The provision of an aerator meeting these requirements is a further primary object of my invention.

A third object of this invention is the automatic rinsing of the vessel in which the culture was treated to keep it always in a sanitary condition and thus avoid serious infection of the culture.

My invention provides a single means whereby all three of these objects may be readily and easily obtained. My invention provides such a means which is simple and rapid to operate and economical to fabricate.

These and other objects and purposes of my invention will be readily seen by those acquainted with the culturing of micro-organisms upon reading the following specification and the accompanying drawings.

In the drawings:

Figure 1 is a side, elevation view of a diagrammatically presented tank in which my combination aerator and rinser is suspended.

Figure 2 is a partially sectional, side, elevation view of my combination aerator and rinser as it appears when used for withdrawing the rinsing liquid.

Figure 3 is a bottom view of my aerator and rinser.

Figure 4:
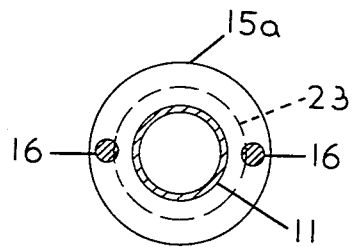
Figure 4 is a sectional view taken along the plane IV—IV of Figure 2.
Figure 5:
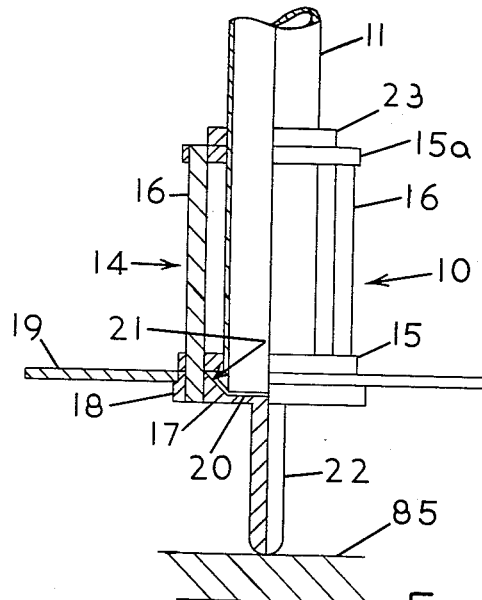
Figure 5 is a partially sectional, side, elevation view of my aerator and rinser showing my invention as it is used for aerating.

In executing the objects and purposes of my invention, I have provided a head for a combined aerator and rinser having a central boss within which there is an upwardly opening depression. The tube through which the air and water is supplied and the diluting agent removed, seats within this depression. The discharge orifice defined between the end of the tube and the depression in the central boss is surrounded by a broad circular plate for shielding any material lying below the plate from the currents created above the plate by the operation of my invention.

In the following description I describe my invention as applied to the brewing industry for the biological purification and aeration of pitching yeast. It will be recognized that this is only one of many possible applications of my invention and is, therefore, not to be considered as a limitation upon the purpose and scope of my invention, since my invention may be used in the distillery, pharmaceutical and chemical industries as well as others.

In the following description the terms "upwardly" and "downwardly" are frequently used and are to be taken to mean "upwardly" in the direction in which my invention is normally used and as it appears in Figure 1 and "downwardly" away therefrom. The terms "inwardly" and "outwardly" are also frequently used and are to be taken as "inwardly" toward the geometric center of my invention and "outwardly" away therefrom.

Referring now to the drawings in detail and specifically to the structure appearing in Figures 1 through 5, a head 10 is mounted on the lower end of a pipe 11. The lower end of the pipe 11 is provided with a radially, outwardly extending rim 12 having a bevelled, lower face 13. The bevelled face 13 extends upwardly and outwardly from the bottom of the rim 12. Slidably mounted on the pipe 11 is a carriage 14 having a pair of annular rings 15 and 15a surrounding the pipe 11 and connected by a pair of diametrically spaced, vertical rods 16. The rings 15 and 15a and the rods 16 are rigidly secured together. The lower ends of the rods 16 pass through and are rigidly secured to the cup 17. It will be recognized that the rods 16 need not necessarily pass through the cup 17 but may be attached to the upper surface of the cup by suitable means such as welding. The cup has an outwardly extending shoulder 18 upon which seats the baffle or circular plate 19. The upper surface of the plate 19 is flush with the upper surface of the cup 17. A depression 20 is provided in the upper face of the cup 17 concentric with the pipe 11. The depression 20 has upwardly and outwardly inclined walls 21 joined by a flat bottom. The walls 21 are parallel to the bevelled face 12 of the rim 12 but are spaced slightly further out to create a narrow, circular passageway between the face 13 and the walls 21 when the carriage is in its raised position.

Depending from the center of the cup 17 is the spacer leg 22. Preferably, but not necessarily, the lower end of the leg 22 is rounded. An annulus 23 is tightly secured to the pipe 11 above the ring 15a. The purpose and exact position of the annulus will be described under "Operation."

The pipe 11 by means of a flexible hose 25 is connected to the hydraulic ejector 26. A source of water under pressure is connected to the hydraulic ejector 26 through the valve 27. Air is supplied to the hose 25 through the valve 28. Discharge from the ejector 26 is controlled by the valve 29.

Figure 6:
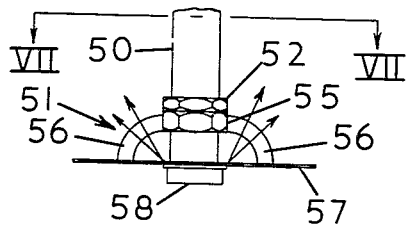
Figure 6 is a side, elevation view of the lower end of a modified structure for my combination aerator and rinser.
Figure 8:
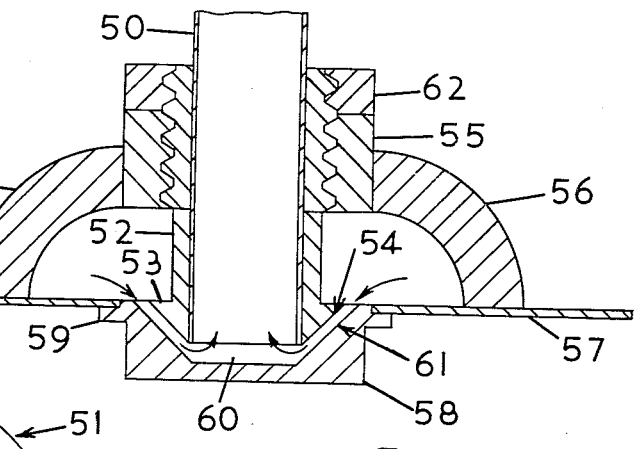
Figure 8 is a sectional view taken along the plane VIII—VIII of Figure 7.
Figure 7:
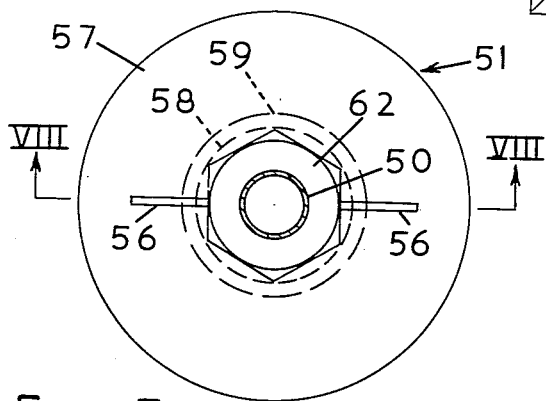
Figure 7 is a sectional view taken along the plane VII—VII of Figure 6.

Referring now to the modified structure of my combination hydraulic ejector, aerator and rinser shown in Figures 6, 7 and 8 of the drawings, the numeral 50 indicates a pipe on which is mounted the head 51. The lower end of the pipe 50 is encircled by an elongated, tubular collar 52 externally threaded on its upper end. The collar 52 is rigidly affixed to the pipe 50. The lower end of the collar 52 has a radially, outwardly extending rim 53, the lower face 54 of which is inclined upwardly and outwardly.

Threadedly engaging the collar 52 is a nut 55 to which is secured, as by welding, a pair of diametrically positioned, downwardly curving arms 56. A large, circular plate 57 equipped with a central opening is secured to the ends of the arms 56. The plate 57 is of substantially greater diameter than the pipe 50 and is rigidly supported by the arms 56. A circular cup 58 is inserted within the central opening in the plate 57. The cup 58 has a shoulder 59 bearing against the lower face of the plate 57 when the upper end of the cup 58 is flush with the upper surface of the plate 57. The cup has a central depression 60 in its upper face having inclined, downwardly converging sides 61 and a flat bottom approximately the same diameter as the pipe 50. The sides 61 are parallel to the lower face 54 of the rim 53 but the size of the depression 60 is such that an annular space of 1/64 of an inch is provided between these parts.

The nut 55 is secured by the lock nut 62 mounted above it. The pipe 50 is adapted to be operatively secured to a hose, valve and ejector structure identical to the hose 25, valves 27, 28 and 29 and the ejector 26.

Since my invention is designed for use in the purification of seed cultures of micro-organisms including yeast of the saccharomyces cerevisiae used in the brewing of beer, all parts of my apparatus must be made of materials inert in the presence of the culture media, the micro-organisms and their by-products. The materials must not impart any flavor to the liquids in which it is immersed. I have found stainless steel a preferable material for effecting these objectives.

Operation

A quantity of selected brewers' yeast is placed in the tank 80. The yeast is diluted by adding to the tank a quantity of water. In cases where microscopic examination of the yeast reveals the presence of a larger than normal count of bacteria, the diluting agent consists of a 2% water-ammonium persulphate solution or any of the commercial yeast washing agents. This treatment is followed by one or more washings of the yeast with water to remove all traces of ammonium persulphate. After the addition of the water, the yeast cells and water are agitated either mechanically by aeration, or manually to create a suspension of the yeast cells in the water. This suspension is passed over a screen of about 80 mesh to remove impurities of larger magnitude. Thereafter, the suspension is allowed to stand for a sufficient period of time for the healthy yeast cells to settle to the bottom. In this procedure, the healthy yeast cells will settle to the bottom of the tank forming a layer indicated as 81 in Figure 1, above which will remain the water 82 with the weak and unhealthy yeast cells together with proteins, bacteria, dead yeast cells and other undesirable matter still in suspension. By withdrawing this wash water with the suspended, undesirable matter therein, the yeast culture will have been purified. It is important that the supernatant water is removed from the tank before complete clarification has taken place. Heretofore, the normal procedure for removing the wash water has been to lower the open end of a stand pipe into the wash water to withdraw it from the tank, or to open bungs or drain cocks located at various levels in the tank wall. These operations are not sanitary and result in the withdrawal of appreciable quantities of the healthy yeast cells, forming the mass 81 at the bottom of the tank. Due to the turbulence and currents created about the open end of the pipe as the liquid is withdrawn, the body of yeast cells 81 is agitated and many of these yeast cells enter the stream of liquid being withdrawn from the tank. My invention is designed to eliminate this difficulty.

When the wash water is to be removed, my invention is lowered until the baffle or plate 19 of the head 10 is approximately 1 inch above the mass 81 of yeast cells settled at the bottom of the tank. With the valve 28 closed, the valves 27 and 29 are opened to cause the hydraulic ejector 26 to withdraw the wash water through the pipe 11 and hose 25. By reason of the weight of the plate 19 and the carriage 14, these parts are caused to slide downwardly until the ring 15 rests upon the rim 12. This widens the passageway between the lower face 13 of the rim 12 and walls 21 of the depression 20. The increased size of the passageway permits rapid withdrawal of the wash water. However, this rapid withdrawal of the wash water will not disturb or agitate the mass of healthy yeast cells collected at the bottom of the tank because the turbulence and currents set up by the withdrawal of the wash water are isolated from them by the baffle or plate 19. The plate acts as a shield of sufficient size that beyond its periphery there are no currents or turbulence to disturb the yeast cells irrespective of the rate of withdrawal of the wash water. The size of the plate is determined by the distance out from the end of the pipe. The plate must extend to effectively shield the area below the shield from the currents created by the suction applied to the pipe. The larger the opening through which the rinse water may enter the pipe, the larger the plate must be to effect this purpose. Thus, almost all of the wash water may be withdrawn from above the collected, healthy yeast cells without simultaneously withdrawing the yeast cells. This is especially important in cases where more than one treatment is necessary as is the case when ammonium persulphate solution is used in the purification process, or where the yeast has the character of staub hefe. The result is an appreciable saving in the quantity of healthy yeast cells and an appreciable increase in the total quantity of yeast resulting from each cycle of operation.

After the yeast has been washed and the rinse water removed, a sterile, liquid nutrient is introduced into the tank. Normally, this nutrient is a first wort. The liquid nutrient and the yeast cells are mixed and the pipe 11 lowered until the leg 22 strikes the bottom 83 of the tank 80. Lowering of the pipe is continued until the annulus 23 contacts the upper ring 15a of the carriage 14. This causes the bevelled, lower face 13 of the rim 12 to approach the walls 21 of the depression 20, closing the passageway at the end of the pipe. The resulting passageway is quite narrow whereby only a thin, finely dispersed stream of air may escape from the end of the pipe 11. Since the leg 22 is normally from one-half to one inch in length the head is automatically spaced this distance from the bottom 83 of the tank 80. When the head 10 has been lowered, the valves 27 and 29 are closed and the valve 28 is opened to admit air through the hose 25 and pipe 11. This air is discharged through the passageway between the cup 17 and the end of pipe 11 in a fine stream of bubbles which work their way up through the mixed nutrient and yeast cells to both provide the necessary oxygen for fermentation and to gently agitate the mixture. After a period of time, the mixture of nutrient and yeast cells will come into high krausen. The head 10 is then withdrawn and the resulting yeast culture is withdrawn through the pipe 84. In the conventional brewery, the resulting yeast culture is pumped directly into the fermenting tanks of the brewery as pitching yeast.

*Example*

One hundred pounds of selected pitching yeast were placed in a tank and to this was added one hundred pounds of sterile, refrigerated water at 34° F. The water and the yeast were thoroughly agitated to form a suspension of the yeast in the water and then screened to remove impurities of larger magnitude. The resulting suspension was allowed to stand for approximately three hours, but not long enough to permit the complete clarification of the supernatant water. At the end of this period of time the desirable, healthy yeast cells had settled to the bottom of the tank. My combination aerator and rinser was then lowered into the tank until the plate or baffle of the head was approximately one inch above the upper surface of the mass of settled out yeast cells at the bottom of the tank. The supernatant wash water was then rapidly withdrawn together with all of the extraneous matter which had remained in suspension in this water.

After removal of the wash water, the head 10 was removed and rinsed. Approximately 150 pounds of first wort was withdrawn from the lauter top, sterilized, cooled to 48° F. and introduced into the yeast tank. The head of my invention was lowered to the bottom of the tank and the wort and yeast cells were thoroughly mixed with the help of the injected air. The flow of air was continued without interruption until the mixture reached high krausen. This required approximately thirty minutes. When the wort-yeast mixture had reached the stage of high krausen, the wort-yeast mixture was pumped from the vessel to the fermenters as pitching yeast.

After the yeast is removed from the yeast tank, the tank has to be cleaned. This cleaning operation can be considerably accelerated by replacing the cover to the yeast tank. Then valve 29 is closed and valve 27 opened. The position of the head 10 is vertically adjusted to a point where the water discharged by the head will cover the entire tank surface. The water flows down the side walls and drains through the tank outlet valve.

It will be recognized that my invention provides a single instrument capable of efficiently and rapidly serving the triple functions of removing the supernatant washing liquid, aerating the wort-yeast mixture and rinsing the vessel. The adjustment of the size of the opening at the end of the pipe 11 is effected automatically and requires no special attention.

The operation of the modified form of my invention illustrated in Figures 6, 7 and 8, is identical to that of the preferred form of my invention shown in Figures 1 through 5, except that the size of the orifice between the cup and the end of the pipe remains constant whether the apparatus is being used for aeration or for removal of the rinse water. The withdrawal of the rinse water will be somewhat slower with a head of this construction due to the restricted orifice through which the rinse water must be withdrawn.

It will be understood that although I have shown only two particular constructions for my improved aerator and rinser, numerous other modifications of my invention may be made, each without departing from the principle of my invention. Each of these modifications is to be considered as included in the hereinafter appended claims unless the language of these claims expressly states otherwise.

I claim:

1. In a head for a combined aerator and rinser, the combination comprising a pipe; a rim mounted to said pipe and surrounding the end thereof; said rim having a radially outwardly and upwardly inclined lower face; guide means operatively mounted to said pipe; a circular plate of substantially greater diameter than said pipe supported by said guide means and adjacent the end of said pipe, said plate being planally perpendicular to said pipe; a circular depression in said plate concentric with said pipe and having upwardly and outwardly inclined walls, the open end of said depression directed toward said pipe for creating a circular, inclined variable passageway between said walls and said lower face of said rim.

2. In a head for a combined aerator and rinser, the combination comprising: a pipe; a rim surrounding the end of said pipe; said rim having a radially outwardly and upwardly inclined lower face; a pair of spaced arms mounted to said pipe; a circular plate of substantially greater diameter than said pipe affixed to the ends of said arms concentrically of said pipe and adjacent the end thereof, said plate being planally perpendicular to said pipe; a circular depression in said plate, the open end of said depression directed toward said pipe; said depression concentric with said pipe and having upwardly and outwardly inclined walls; said inclined walls and said lower face of said rim defining a narrow ring-like channel therebetween.

3. In a head for a combined aerator and rinser, the combination comprising: a substantially vertical pipe open at its lower end; a pair of stops mounted on said pipe adjacent the lower end thereof, said stops spaced axially of said pipe; a carriage slidably mounted on said pipe intermediate said stops; one end of said carriage depending below the lower end of said pipe; a plate of substantially greater diameter than said pipe mounted on said end of said carriage substantially perpendicular to the axis of said pipe; said plate spaced a short distance from the end of said pipe when said carriage is in contact with the upper of said stops.

4. In a head for a combined aerator and rinser, the combination comprising: a pipe; a rim mounted to said pipe and surrounding the end thereof; said rim having a radially outward and upwardly inclined lower face; a carriage including a first member and a second member each slidably embracing said pipe; a circular plate of substantially greater diameter than said pipe; said plate mounted on said carriage concentrically of said pipe and spaced from the end thereof; a stop affixed to said pipe and spaced from said rim; a depression in said plate opening toward said pipe and concentric therewith; the walls of said depression diverging upwardly whereby a narrow inclined ring-like passageway is defined between said walls and the lower face of said rim when said first member is in contact with said stop and a wide passageway is defined between said walls and said rim when said second member is in contact with said rim.

References Cited in the file of this patent

UNITED STATES PATENTS

| | | |
|---|---|---|
| 210,034 | Higgins | Nov. 19, 1878 |
| 305,719 | Somerville | Sept. 23, 1884 |
| 519,796 | Schutte | May 15, 1894 |
| 990,861 | Hamill | May 2, 1911 |
| 1,017,900 | Phillips | Feb. 20, 1912 |
| 1,095,827 | Daill | May 5, 1914 |
| 1,286,775 | Rein et al. | Dec. 3, 1918 |
| 1,540,206 | Crickmer | June 2, 1925 |
| 1,677,501 | Stone et al. | July 17, 1928 |
| 2,199,874 | Brand | May 7, 1940 |
| 2,460,258 | Jones | Jan. 25, 1949 |
| 2,620,299 | Deters et al. | Dec. 2, 1952 |

FOREIGN PATENTS

| | | |
|---|---|---|
| 79,563 | Austria | Dec. 29, 1919 |